UNITED STATES PATENT OFFICE.

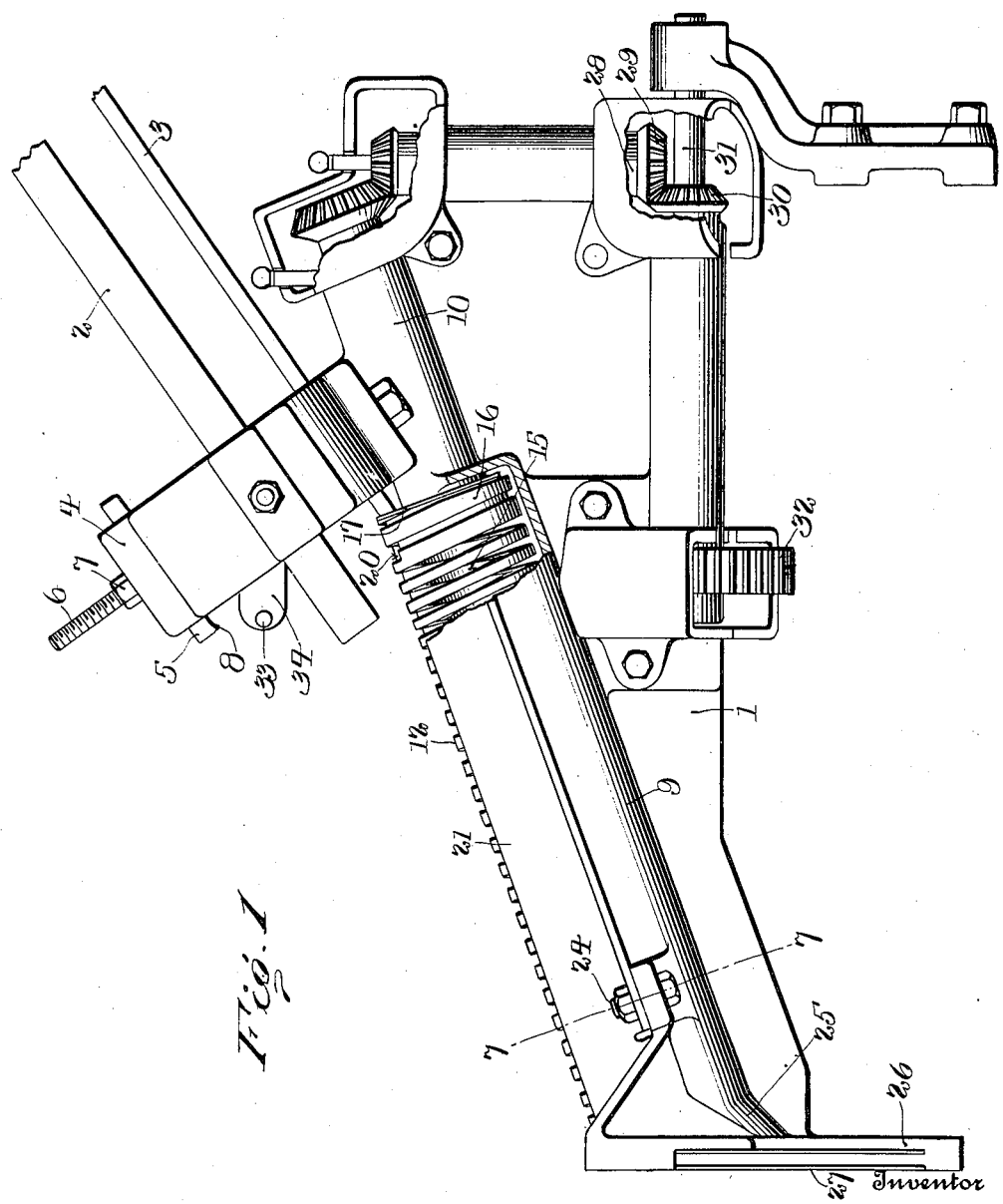

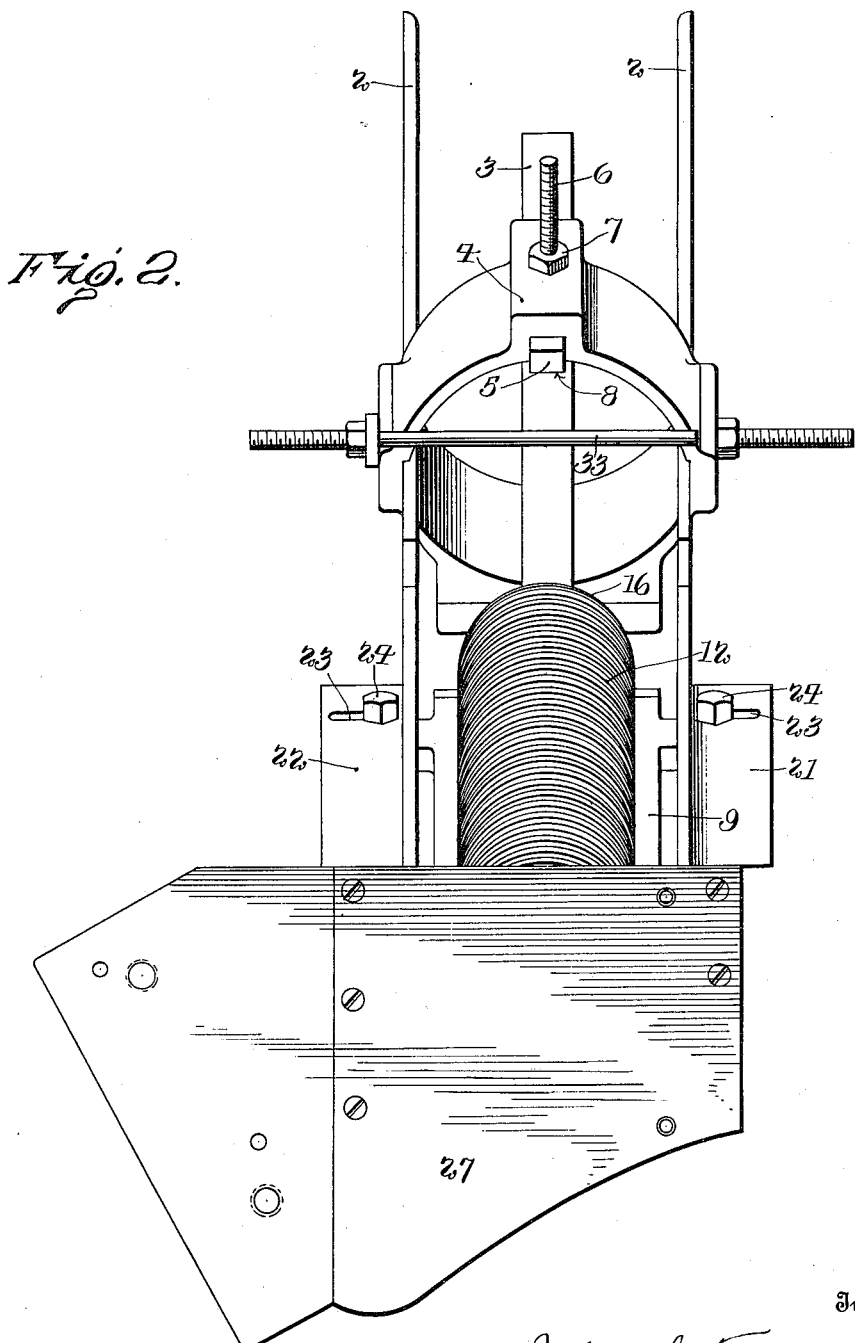

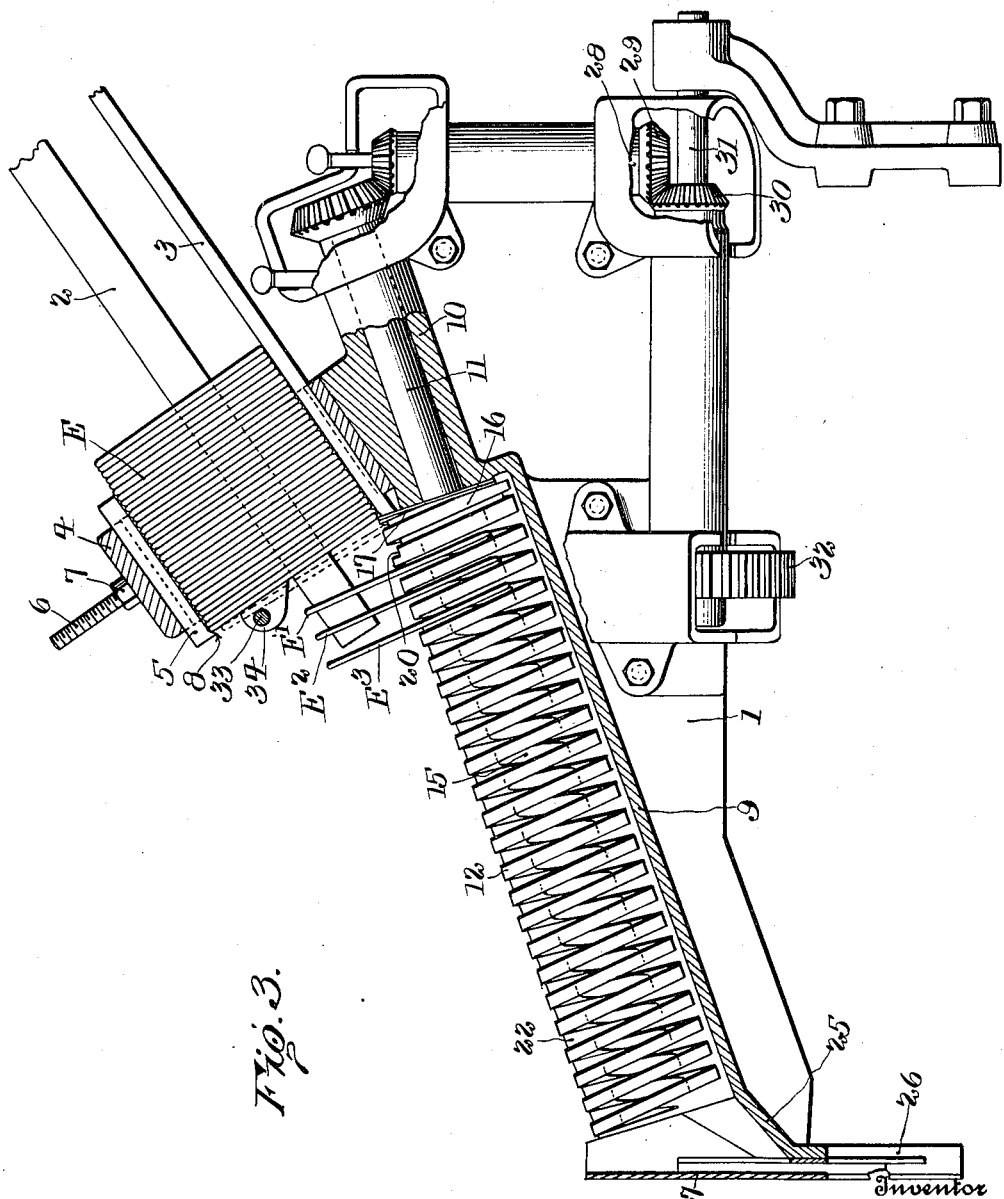

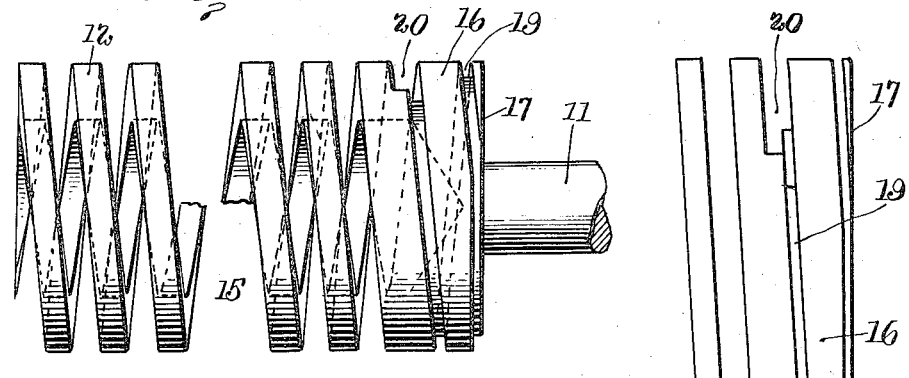
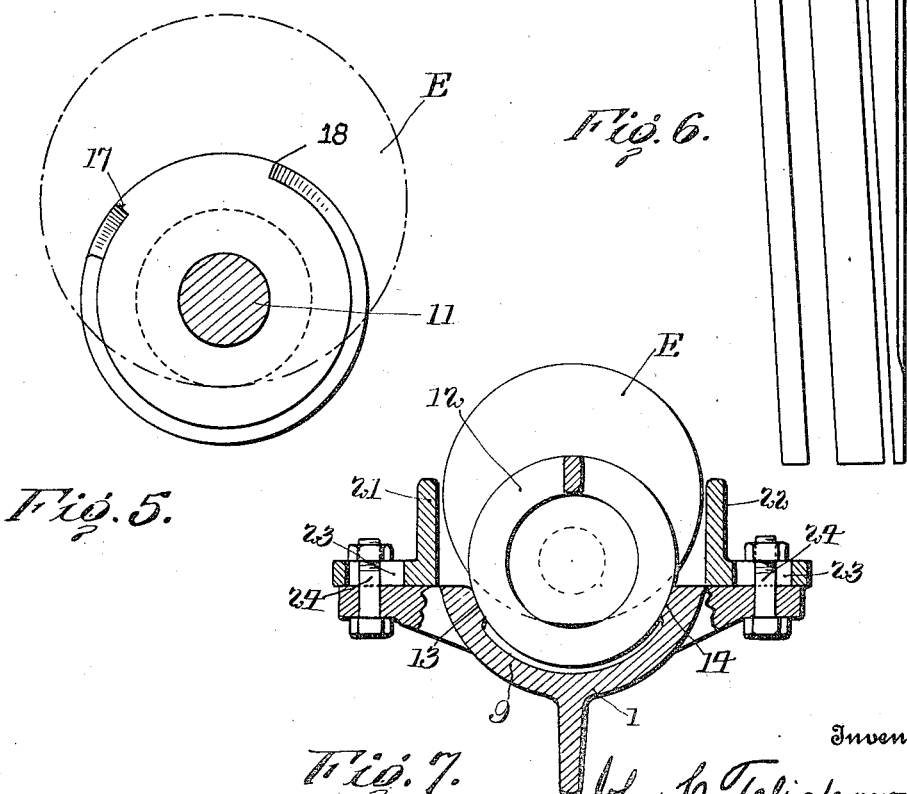

JOHN C. TALIAFERRO, OF BALTIMORE, MARYLAND, ASSIGNOR TO CONTINENTAL CAN COMPANY, OF SYRACUSE, NEW YORK, A CORPORATION OF NEW YORK.

CAN-END-FEEDING MECHANISM.

1,320,292.     Specification of Letters Patent.     Patented Oct. 28, 1919.

Application filed July 19, 1915. Serial No. 40,605.

*To all whom it may concern:*

Be it known that I, JOHN C. TALIAFERRO, a citizen of the United States, residing at Baltimore, in the State of Maryland, have invented certain new and useful Improvements in Can-End-Feeding Mechanism, of which the following is a description, reference being had to the accompanying drawing, and to the figures of reference marked thereon.

The invention relates to new and useful improvements in can end feeding devices, and more particularly to devices for taking can ends from a stack and presenting the same to an operating mechanism.

An object of the invention is to provide means for separating can ends one at a time from a stack, which means also retains and separates a plurality of ends and delivers the same one at a time to the operating mechanism.

A further object of the invention is to provide a device of the above character, wherein the ends after being separated from the stack are separated a predetermined distance and finally delivered one after another to an operating mechanism.

A still further object of the invention is to provide a device of the above character, wherein the separating and retaining means holds the ends in inclined position and wherein said separating and retaining means is accessible for the insertion of an end at any point or position, thereby insuring that the ends will be delivered to the operating machine at regular spaced intervals of time.

In devices as heretofore used for taking can ends from a stack and presenting the same to an operating mechanism, it frequently happens that under the pressure of the can ends in the stack due to gravity, when the lowermost end is pushed from the stack, it, or the can end above it, will be scratched, and it is one of the objects of my invention to provide such an apparatus for taking can ends from a stack as will obviate this objection. The hereinafter described and claimed apparatus especially lends itself to the elimination of this objection, since the can ends are picked from the bottom of the stack rather than dragged or pushed therefrom.

These and other objects will in part be obvious and will in part be hereinafter more fully disclosed.

In the drawings, which show by way of illustration, one embodiment of the invention:—

Figure 1 is a view partly in section and partly in side elevation, showing an end feeding mechanism embodying my improvements;

Fig. 2 is a plan view of the same;

Fig. 3 is a longitudinal sectional view through the end feeding device;

Fig. 4 is a detail, showing in side elevation the stripper for stripping the end from the stack and the separating helix for feeding and delivering the ends;

Fig. 5 is an end view of the same;

Fig. 6 is a view showing a development of the stripping device and one of the turns of the helix; and Fig. 7 is a sectional view on the line 7—7 of Fig. 1.

In carrying out my invention, I have provided a stack holder which is preferably set so that the axis of the stack is inclined to the vertical. As a means for stripping the ends from the stack holder, I have provided a combined stripping, separating, and feeding helix, which is located with its longitudinal axis slightly inclined to the axis of the stack and slightly inclined to the horizontal, so that gravity will assist in holding the ends on the helix and feeding the same along. The ends after being stripped from the stack drop between the coils or turns of the helix and are held upright by the helix and as the helix rotates they will be gradually progressed to the delivering end thereof, where they are released, so that they may drop into a chute, or the like, and be conveyed to an operating mechanism.

Referring more in detail to the drawings, my improved end feeding mechanism consists of a supporting frame 1, which carries a stack holder with side bars 2 and a bottom support 3. This stack holder is arranged at an angle to the vertical, as clearly shown in the figures of the drawings. Said stack holder adjacent its lower end is provided with a sleeve 4, which carries a retaining bar 5 that may be adjusted for varying sizes of can ends. This retaining bar is adapted to bear on the upper edges of the can ends, which are indicated at E in the drawings. Said retaining bar is fixed to a threaded rod 6, which is held in adjusted position by a nut 7. Said bar has a depending lip 8, which engages the lowermost end of the stack. The side bars 2 project beyond the sleeve and are fixed to the sleeve by suitable clamping means.

Said frame 1 is formed with a segmental guide 9 and with a bearing 10. A shaft 11 is mounted in the bearing 10 and this shaft is rigidly attached to a helix 12. The guiding segment 9 is formed with bearing surfaces 13 and 14 for this helix. The helix, as herein shown, is formed from a rectangular bar coiled spirally, the turns or coils thereof being regularly spaced from each other to form a hollow helix adapted to receive can ends between the successive coils thereof. As shown clearly in Figs. 5 and 7, each can end carried between the coils passes across the central axis of the helix, the edge of said can end resting or seating on the inner face of each coil. This helix is connected to or formed integral with a stripper 16. The stripper 16 is provided with a hardened stripping edge 17. From the stripping edge 17 to a point 18, the face of the stripper lies in a plane substantially at right angles to the axis of the shaft 11. The other edge of the stripping blade 17 leads into a groove 19. This groove extends about the surface of the stripper cylinder in a helical direction and finally opens into the space 20, see Fig. 4, where the first portion of the main helix 12 begins.

Extending along each side of the main helix are guide bars 21 and 22. Each guide is in the form of an angle plate and has a slot 23 through which a bolt 24 passes and these bolts clamp the guide bars to the frame 1. By adjusting the guide bars, the end feeding device may be adapted for the different size ends. The frame 1 at its lower end terminates in a downwardly inclined portion 25. A chute 26 is attached to the lower end of the frame and a cover plate 27, together with the inclined portion 25, directs the ends when released by the helix into the chute. The main shaft 11 is rotated by a vertical shaft 28, mounted in suitable bearings in the frame, and this shaft is in turn connected by a bevel gear 29 to a bevel gear 30 on a shaft 31. The shaft 31 carries a gear 32, to which power may be applied for rotating the parts.

In the operation of my device, the rotation of the shaft 11 will cause the lip or stripping edge 17 of the stripper to pass between the lowermost end and the remainder of the stack and release said end from the stack in the manner shown in Fig. 3 of the drawing. As the shaft continues to rotate the end will rest in the groove 20 of the surface of the stripper and against the rod 33, which is mounted in suitable arms 34, carried by the stack holder. The rotation of the shaft carries the lower edge of the end along the groove and finally causes the end to drop into the space 20. As the end drops into said space it will rest on the lower section of the helix.

I have shown at E' in Fig. 3 a can end loaded on to the helix ready to be progressed by the helix as it rotates. In the next rotation of the stripper another can end will be separated from the stack, carried along and dropped into the space 20. During this movement of the stripper, the first end received thereby has been progressed to another position, and when another end is received from the stack the two ends already on the helix will be further progressed, taking up, respectively, the positions indicated at E', E² and E³. A continued rotation of the shaft 11 will fill the entire helix with can ends, after which they will be released one at a time at the lower end of the helix and as a can end is released it will slide down the incline 25 into the chute and then pass on to the operating mechanism, which may be a machine of any character.

From the above description, it will be apparent that I have provided means for releasing the can ends one at a time from the stack holder, after which they are separated a predetermined space and progressed along the retaining or supporting means therefor and finally released one at a time at regular time intervals. This separating of the ends enables one to readily see whether an end has been skipped; and, if it has, a can end may be readily placed at any point in the helix, so that it will be filled with ends, which is essential to the delivering of the ends at regular intervals to an operating machine. It is obvious that the device may be readily adjusted for different size ends and that it may be applied to any character of operating machine to which it is desirable to feed the can ends one at a time and at regular intervals.

While I have described my improved can end separating and delivering means as used in conjunction with means for stripping can ends from a stack holder, it is obvious that said helix may be fed by hand and the can ends thereby delivered at regular spaced intervals of time.

It is obvious that minor changes in the details of construction and arrangement of parts may be made without departing from the spirit of the invention, as set forth in the appended claims.

Having thus described my invention, what I claim as new and desire to secure by Letters Patent, is:

1. A can end feeding device including in combination, a stack holder, a single rotating means for releasing the can ends one at a time from said stack holder, means for supporting the can ends on edge and in planes parallel with each other, said means being constructed so as to space said can ends at regular intervals and feed the same one at a time to an operating mechanism, said spacing means being accessible to the operator whereby a can end may be inserted at any point or positioned therein.

2. A can end feeding device including in combination, a bar curved to form a helix, means for feeding the can ends on edge between the adjacent turns of the helix at one end thereof, and means for rotating the helix for feeding the can ends forward and for delivering the can ends at the other end of the helix at equal timed intervals, said can ends being held by the helix in planes parallel with each other and moved by the helix sidewise in their forward movement.

3. A can end feeding device including in combination, a bar curved to form a helix, means for feeding the can ends on edge between the adjacent turns of the helix at one end thereof, and means for rotating the helix for feeding the can ends forward and for delivering the can ends at the other end of the helix at equal timed intervals, said can ends being held by the helix in planes parallel with each other, said helix being inclined and accessible to the operator whereby a can end may be inserted between any of the turns of the helix if desired.

4. A can end feeding device including in combination a supporting frame, a rotating shaft, a bar curved to form a helix attached to and rotating with said shaft, guides associated with said helix whereby can ends may be placed between the turns of the helix in planes parallel with each other at one end thereof and fed forward by the helix and delivered at the other end thereof at equal time intervals.

5. A can end feeding device including in combination a supporting frame, a rotating shaft, a bar curved to form a helix attached to and rotating with said shaft, guides associated with said helix whereby can ends may be placed between the turns of the helix in planes parallel with each other at one end thereof and fed forward by the helix and delivered at the other end thereof at equal time intervals, a stack holder and means for releasing the can ends from the stack holder and positioning the same between the turns of the helix.

6. A can end feeding device including in combination a supporting frame, a rotating shaft, a bar curved to form a helix attached to and rotating with said shaft, guides associated with said helix whereby can ends may be placed between the turns of the helix in planes parallel with each other at one end thereof and fed forward by the helix and delivered at the other end thereof at equal time intervals, said helix being inclined to the vertical, a stack holder at one end of said helix, and means for delivering the can ends one at a time from the stack holder to the helix, said helix operating to move the can ends forward and to deliver the same at equal time intervals.

7. A can end feeding device including in combination, a supporting frame having a guiding segment, a helix mounted on said guiding segment, a shaft fixed to said helix, a stripper formed integral with said helix, a stack holder associated with said stripper, whereby can ends are stripped one at a time from the stack and positioned between the turns of the helix in planes parallel with each other and fed forward sidewise by the helix.

8. A can end feeding device including in combination, a supporting frame having a guiding segment, a helix mounted on said guiding segment, a shaft fixed to said helix, a stripper formed integral with said helix, a stack holder associated with said stripper, whereby can ends are stripped one at a time from the stack and positioned between the turns of the helix, guides extending along the sides of said helix, said can ends being adapted to rest on the helix as they are fed along by the same.

9. A can end feeding device including in combination, means for holding a stack of can ends, a single helix adapted to release can ends therefrom one at a time, support the same, in planes parallel to each other at regular spaced intervals, and feed the same successively to an operating mechanism.

10. A can end feeding device including in combination, means for holding a stack of can ends, a single helix formed with an integral stripping edge, said helix being adapted to release said can ends successively from said stack, support the can ends in planes parallel to each other at regular spaced intervals, and feed the can ends successively to an operating mechanism.

11. A can end feeding device including in combination a stack-holder, and a single helix having an integral stripping edge adapted to successively release the can ends from said stack, said helix being adapted to convey the can ends in equi-spaced relation.

12. A can end feeding device including in combination, a stack-holder, a spacing and feeding means therefor including a hollow helix adapted to receive the can ends endwise between the coils within the hollow portion thereof to convey the can ends in spaced relation.

13. A can end feeding device including in combination, a stack-holder, a rotating helix, the coils thereof being spaced apart to form seats for the can ends, whereby the same are conveyed in parallel spaced relation from said stack-holder.

14. A can end feeding device including in combination, a stack-holder, a hollow rotating helix having spaced apart coils to receive the can ends therebetween and to convey the same in parallel spaced relation from the stack-holder.

15. A can end feeding-device including in combination a stack-holder, a bar formed into a hollow helix and having spaced coils to receive the can ends edgewise therebetween means for successively feeding can ends from said stack-holder to said helix, and means for rotating the same.

16. A can end feeding device including in combination, a stack-holder, a bar formed into a hollow helix and having spaced coils to receive the can ends edgewise therebetween, said bar having a stripping edge to successively transfer the can ends from said stack-holder to said helix, and means for releasing said helix.

In testimony whereof, I affix my signature, in the presence of two witnesses.

JOHN C. TALIAFERRO.

Witnesses:
CHARLES L. STURTEVANT,
GRACE P. BRERETON.

Copies of this patent may be obtained for five cents each, by addressing the "Commissioner of Patents, Washington, D. C."